US011665325B2

(12) United States Patent
Roudaut et al.

(10) Patent No.: US 11,665,325 B2
(45) Date of Patent: May 30, 2023

(54) DEVICE FOR AUGMENTED REALITY APPLICATION (71) Applicant: SOCIETE BIC, Clichy (FR)

(72) Inventors: Etienne Roudaut, La Garenne Colombes (FR); Loïc Folgoas, Paris (FR)

(73) Assignee: SOCIÉTÉ BIC, Clichy (FR)

( * ) Notice: Subject to any disclaimer, the term of this patent is extended or adjusted under 35 U.S.C. 154(b) by 136 days.

(21) Appl. No.: 16/772,349

(22) PCT Filed: Dec. 14, 2018

(86) PCT No.: PCT/FR2018/053306
§ 371 (c)(1),
(2) Date: Jun. 12, 2020

(87) PCT Pub. No.: WO2019/115979
PCT Pub. Date: Jun. 20, 2019

(65) Prior Publication Data
US 2021/0084267 A1 Mar. 18, 2021

(30) Foreign Application Priority Data
Dec. 14, 2017 (FR) ...................................... 1762132

(51) Int. Cl.
H04N 5/335 (2011.01)
H04N 9/31 (2006.01)
H04N 23/54 (2023.01)
H04N 23/55 (2023.01)

(52) U.S. Cl.
CPC ........... H04N 9/3141 (2013.01); H04N 23/54 (2023.01); H04N 23/55 (2023.01)

(58) Field of Classification Search
CPC ............................. G06F 3/0425; H04N 9/3141
See application file for complete search history.

(56) References Cited

U.S. PATENT DOCUMENTS

| 2004/0046744 | A1  | 3/2004  | Rafii et al. |
| 2014/0139717 | A1* | 5/2014  | Short .................. H04N 9/3185 348/333.1 |
| 2014/0168267 | A1* | 6/2014  | Kim ....................... G06F 3/017 345/633 |
| 2014/0362052 | A1  | 12/2014 | McCaughan et al. |
| 2015/0169134 | A1  | 6/2015  | Givon |
| 2016/0277719 | A1* | 9/2016  | Tan ....................... G06F 3/0426 |
| 2017/0347007 | A1* | 11/2017 | Wu .......................... G06T 11/60 |
| 2020/0089085 | A1* | 3/2020  | Solomon .............. G03B 17/565 |
| 2020/0232598 | A1* | 7/2020  | Roudaut .............. F16M 11/041 |

OTHER PUBLICATIONS

International Search Report and Written Opinion issued in International Application PCT/FR2018/053306, dated Mar. 26, 2019, with English Translation (14 pages), Feb. 8, 2023.

* cited by examiner

Primary Examiner — Gary C Vieaux
(74) Attorney, Agent, or Firm — Bookoff McAndrews, PLLC (57) ABSTRACT A device configured to capture a first image and to project a second image, the device comprising a support; a camera configured to capture, or a first mirror configured to capture and reflect towards a camera, a first image of a work area, the camera or the first mirror being mounted on the support; and a projector configured to project, or a second mirror configured to reflect and project, a second image on the work area, the projector or the second mirror being mounted on the support.

10 Claims, 5 Drawing Sheets

FIG.5 derives # DEVICE FOR AUGMENTED REALITY APPLICATION

CROSS REFERENCE TO RELATED APPLICATION(S)

This application is a National Stage Application of International Application No. PCT/FR2018/053306, filed on Dec. 14, 2018, now published as WO2019/115979 and which claims priority to French Application No. FR1762132, filed on Dec. 14, 2017.

TECHNICAL FIELD

The present disclosure relates to a device for augmented reality applications, configured to capture a first image and to project a second image onto a work area. Augmented reality is a technology comprising, possibly in real time, superimposing additional information on information from the real world.

BACKGROUND

The known apparatuses for application of augmented reality generally do not allow an easy and/or comfortable application for writing/drawing. There is therefore a need in this sense.

SUMMARY

One embodiment relates to a device configured to capture a first image and to project a second image, the device comprising:
  a support,
  a camera configured to capture, or a first mirror configured to capture and reflect towards a camera, a first image of a work area, the camera or the first mirror being mounted on the support,
  a projector configured to project, or a second mirror configured to reflect and project, a second image on the work area, the projector or the second mirror being mounted on the support.

It is therefore understood that the device comprises the camera and the projector or the camera and the second mirror, or the first mirror and the projector, or even the first mirror and the second mirror.

When the device includes the camera, it is understood that the camera is configured to directly observe the work area and capture the first image which is representative of the work area. In other words, the camera directly captures the first image, and forms a so-called primary camera.

When the device includes the first mirror, it is understood that the first mirror is configured to directly observe the work area and capture the first image which is representative of the work area. The camera, which of course is different from the primary camera, since this variant does not comprise a primary camera, is configured to observe the first mirror which returns the first image to it and thus indirectly captures the first image via the mirror. The camera thus forms a secondary camera. The camera can be part of the device, or part of an element that is separate from the device.

In other words, the first mirror is directed towards the work area so as to directly capture and reflect the first image towards the camera. The first mirror therefore directly observes the work area whereas the camera observes the mirror and indirectly captures the first image.

When the device includes the projector, it is understood that the projector is configured to project the second image directly into the work area. In other words, the projector forms a so-called primary projector.

When the device includes the second mirror, it is understood that the second mirror is configured to project the second image directly onto the work area. A projector, which of course is different from the primary projector, since this variant does not comprise a primary projector, is configured to project the second image on the second mirror, which reflects it and projects it into the work area. The projector thus forms a secondary projector. The projector can be part of the device, or it can be part of an element separate from the device.

A projector is any type of optical instrument allowing the projection of an image, for example, a video projector.

It is understood that the first image of the work area is a view, or a reproduction of the work area at a given time. The first image therefore corresponds to a reproduction of the work area, as it appears in the real world, at a given time.

A work area is an area in which the user of the device wishes to make a registration on a work support. In other words, the area towards which the camera (primary) or the first mirror and the second mirror or the projector (primary) point, is the work area. The work support is therefore wholly or partly arranged in the work area. For example, the work support comprises a two or three-dimensional surface, on which the user wishes to make a registration. The registration can be lettering, a drawing, etc. In some cases, the creation of the registration is already started on the work support when the first image is captured. In other words, the work support can comprise at least a partial registration forming a part of the final registration that the user wishes to make.

The second image can represent, for example, at least a portion of the registration that has not yet been produced. The second image, projected in the work area, will appear in such a way that it will be "superimposed" on top of the work support, and on top of at least one already completed portion of the registration, if this is already partially completed. The second image will therefore be projected so that the at least one portion of the registration that has not yet been produced is laid out at a determined location in the work area. It is therefore understood that the second image is generated from a processing of the first image and constitutes a complementary part of the first image.

The device according to this disclosure thus allows an improvement of the user experience for augmented reality applications. Indeed, the user can directly transcribe at least a portion of the second image directly on the work support, in the work area, without having to consult a model which would be outside the work area, by following a pattern from the second image. The device is also simple to make and reproducible. The device according to this disclosure furthermore has good use ergonomics.

In specific embodiments, the support has a mounting plane intended to come to bear on a mounting surface, and in which an optical axis of the camera is inclined relative to the mounting plane, the angle between the optical axis of the camera and the mounting plane is between 45° (forty-five degrees of angle) and 90° (ninety degrees of angle), or the first mirror being inclined relative to the mounting plane, the angle between the first mirror and the mounting plane is between 0° (zero degree of angle) and 45° (forty-five degrees of angle).

It is understood that the support is configured to be placed on a mounting surface. For example, the support can be placed on the same plane as the work support. Relative to the position of the user, when the user performs the registration, the work area is arranged just in front of the support.

For example, the support comprises a base configured to be arranged directly or indirectly on the mounting surface. The base can be configured to support the support by itself and, more generally, the device. According to a variant, an additional part, for example, a leg, makes it possible, with the base, to maintain the support in position on the mounting surface. For example, the base has a linear line of contact or two points of contact defining a mounting plane with a point of contact of the leg. The mounting plane is the plane of the support configured to be placed on the mounting surface. It is understood that the mounting surface is the area upon which the user wishes to arrange the device. Thus, the mounting surface can be formed by a flat surface, but not only a flat surface.

The camera or the first mirror is mounted on the support so as to be inclined at a determined angle so that the camera or the first mirror observes the work area and captures the first image. Such an angle makes it possible to point to a work area that is adjacent to the device and that is intuitive for the use of the device. Thus, the device is even simpler to use, even more ergonomic and makes it possible to further improve the user experience for an augmented reality application.

In specific embodiments, the geometric center of an external lens of the primary camera is arranged at a height, the height corresponding to the distance between the mounting plane and the geometric center of the primary camera, between 20 mm (twenty millimeters) and 400 mm (four hundred millimeters) from the mounting plane. In specific embodiments, the geometric center of the external lens of the primary camera is arranged at a distance of between 10 mm (ten millimeters) and 420 mm (four hundred and twenty millimeters) from the working area, projected onto a vertical direction. It is therefore understood that the mounting plane and the working area can be registered in the same plane, but can also be registered on different planes.

In specific embodiments, the geometric center of the first mirror is arranged at a height of between 20 mm (twenty millimeters) and 450 mm (four hundred and fifty millimeters) relative to the mounting plane. In specific embodiments, the geometric center of the first mirror is arranged at a distance of between 100 mm (one hundred millimeters) and 450 mm (four hundred and fifty millimeters) from the work area, projected onto a vertical direction.

In specific embodiments, the support has a mounting plane intended to come to bear on a mounting surface, in which an optical axis of the projector is inclined relative to the mounting plane, the angle between the optical axis of the projector and the mounting plane is comprised between 50° (fifty degrees of angle) and 90° (ninety degrees of angle), or in which the second mirror is inclined compared to the mounting plane, the angle between the second mirror and the mounting plane is between 0° (zero degrees of angle) and 40° (forty degrees of angles).

The projector or the second mirror is therefore mounted on the support so as to be inclined at a particular angle so that the projection is carried out in the work area. Such an angle makes it possible to point to a work area that is adjacent to the device and that is intuitive for the use of the device. Thus, the device is even simpler to use, even more ergonomic and makes it possible to further improve the user experience for an augmented reality application.

In specific embodiments, the geometric center of an external lens of the primary projector is arranged at a height of between 50 mm (fifty millimeters) and 400 mm (four hundred millimeters) relative to the mounting plane. In specific embodiments, the geometric center of the external lens of the primary projector is arranged at a distance of between 100 mm (one hundred millimeters) and 450 mm (four hundred and fifty millimeters) from the work area, projected onto a vertical direction.

In specific embodiments, a geometric center of the second mirror is arranged at a height of between 50 mm (fifty millimeters) and 500 mm (five hundred millimeters) relative to the mounting plane. In specific embodiments, the geometric center of the second mirror is arranged at a distance of between 100 mm (one hundred millimeters) and 500 mm (five hundred millimeters) from the work area, projected onto a vertical direction.

In specific embodiments, the device includes a communication interface mounted on the support configured to allow communication between the device and a separate device or a communication network.

The communication interface therefore enables connection of the device to a device that is separate from the device, this device being able to be embedded within the device or not, for example, an electronic device of everyday life, such as a multimedia tablet or equivalent.

For the purposes of this disclosure, "multimedia tablet or equivalent" is a multimedia tablet, a smartphone, a portable computer comprising a screen, for example a touch screen. In some examples the screen may be equipped with an optical system and the keyboard of which can be retractable or removable, or any other electronic device which may include a screen and an integrated optical system. A multimedia tablet is sometimes referred to as a touch pad, electronic tablet, electronic slate, digital tablet, or simply a tablet. A smartphone is sometimes referred to as a multi-function phone or computer phone. For the purposes of this disclosure, Apple®-branded iPads® or iPhones® are examples of multimedia tablets or equivalent. Hereinafter, and unless otherwise indicated, "tablets" are "multimedia tablets or equivalents." The other device can also be a computer, for example, a desktop, or any device comprising a processing unit and/or a user interface, such as a screen.

A communication network can, for example, be a telephone communication network or else the internet network.

For example, the communication interface can be mounted directly or indirectly on the support. For example, the communication interface can be mounted on another of the elements of the device, which themselves are mounted on the support.

It is understood that the communication interface is configured to put the device in communication with the separate device, or a communication network. In other words, the device, that is to say one of the elements of the device, is configured to communicate with the separate device or a communication network via the communication interface.

For example, the communication interface can allow communication between the primary camera or the secondary camera, and the primary projector or the secondary projector and a processing unit that is external to the device, for example the processing unit of a tablet or equivalent, when the device does not include a processing unit.

For example, the communication interface can allow communication between a processing unit of the device, when the device includes a processing unit, and a remote user interface, for example, the user interface of the other device.

For example, the communication interface can allow communication between the device and the communication network. For example, if the device includes a user interface, the user will be able to download new registration templates from the communication network such as the Internet.

For example, the communication interface can be a socket configured to receive a plug or else a transmitter/receiver, configured to transmit or receive information by a communication protocol of the WIFI or Li-Fi Bluetooth type or compliant with the IEEE 802.11 standard, or by a communication protocol towards a telephone network or the Internet.

It is therefore sufficient for the user to connect the device to this separate device in order to be able to use it, via the device, for augmented reality applications. Thus, the device is even simpler to use, even more ergonomic and makes it possible to further improve the user experience for an augmented reality application.

In specific embodiments, different elements of the tablet each include a communication interface, called an "internal communication interface," making it possible to communicate with the other elements of the device.

In specific embodiments, the device includes a processing unit mounted on the support, the processing unit being configured to generate the second image from the first image.

It is understood that the processing unit is integrated into the device, thanks to which the device is autonomous for generating the second image. This further improves the ease of use of the device and its ergonomics.

Alternatively, the device includes a user interface for using the device. For example, the user can choose a registration to perform from the user interface.

In specific embodiments, the support is configured to receive a multimedia tablet or equivalent, equipped with a camera, the first mirror being movable, so as to come into line in front of the camera of the multimedia tablet or equivalent.

The user can thus place the multimedia tablet or equivalent on the support, facing them during the registration process. It is further understood that the camera of the multimedia tablet or equivalent forms the secondary camera. The first mirror is movable so as to be arranged in front of the camera of the tablet. Thus, the device is even simpler to use, even more ergonomic and makes it possible to further improve the user experience for an augmented reality application. Furthermore, this makes it possible to make the device easily adaptable to different devices already in the possession of the user.

In specific embodiments, the camera, or the first mirror is unitary to the support.

The camera or the first mirror is therefore mounted unitary to the support in order to maintain its inclination and its position on the support. Thus, the device is even simpler to use, even more ergonomic and makes it possible to further improve the user experience for an augmented reality application. The device is also even easier to manufacture.

In specific embodiments, the projector or the second mirror is unitary to the support.

The projector or the second mirror is therefore mounted unitary to the support in order to maintain its inclination and its position on the support. Thus, the device is simple to use, more ergonomic and improves the user experience for an augmented reality application. The device is also easier to manufacture.

For example, the secondary camera belongs to the device and is mounted unitary to the support.

In specific embodiments, the relative position between the primary camera or the first mirror and the primary projector or the second mirror is set. This makes it possible to reduce the necessary computing power of the processing unit and therefore makes it possible to offer a simpler and less expensive device.

In specific embodiments, the device includes a (secondary) projector, configured to project the second image to the second mirror.

The secondary projector is therefore integrated into the device. Thus, the device is even simpler to use, even more ergonomic and makes it possible to further improve the user experience for an augmented reality application. The device is also even more easily reproducible.

The secondary projector can be unitary to the second mirror so as to improve the ergonomics and the reproducibility of the tablet.

In specific embodiments, the device is configured to capture a first image having an area between 100 $cm^2$ (one hundred square centimeters) and 1,600 $cm^2$ (one thousand six hundred square centimeters).

In specific embodiments, the device is configured to capture a first image arranged at a distance less than or equal to 5 cm (five centimeters) from the support.

In specific embodiments, the device is configured so that the projection of the second image in the work area has an area between 225 $cm^2$ (two hundred and twenty-five square centimeters) and 3,000 $cm^2$ (three thousand square centimeters).

In specific embodiments, the device according to one of the preceding claims, configured so that the projection of the second image in the working area is arranged at a distance less than or equal to 20 cm (twenty centimeters) from the support.

BRIEF DESCRIPTION OF THE DRAWINGS

The subject matter of this disclosure and its advantages will be better understood on reading the detailed description given below of various embodiments given by way of nonlimiting examples. This description refers to the pages of attached figures, on which.

DETAILED DESCRIPTION

Figure 1A:
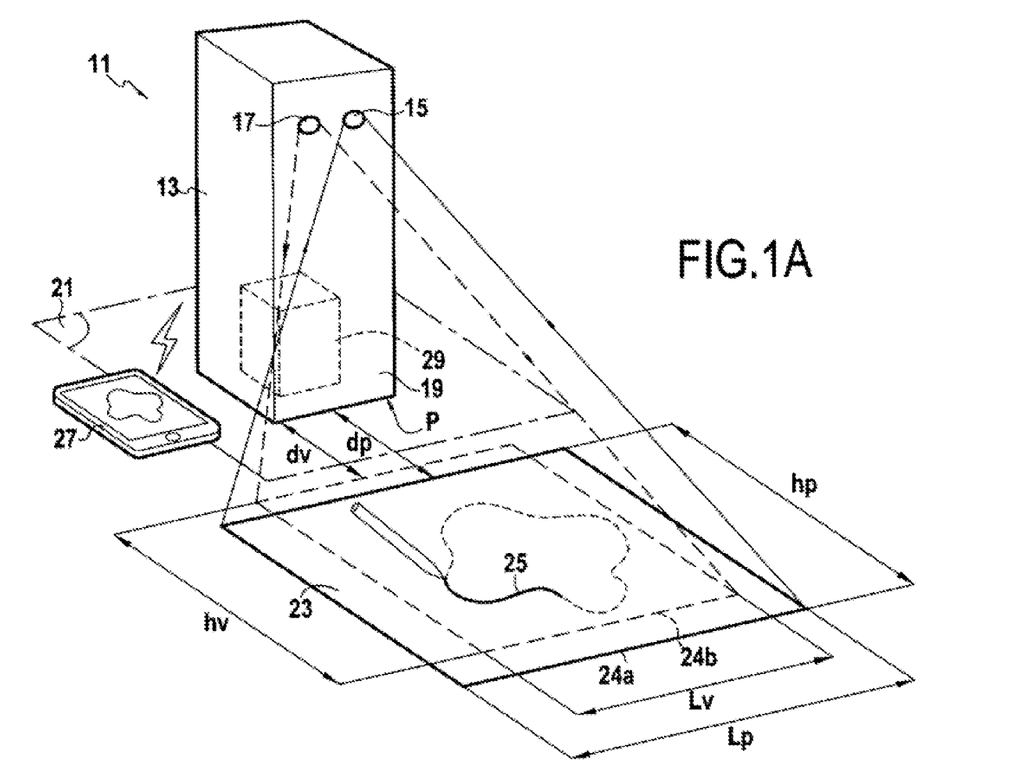
FIGS. 1A, 1B and 1C show an device according to a first embodiment.
Figure 1B:
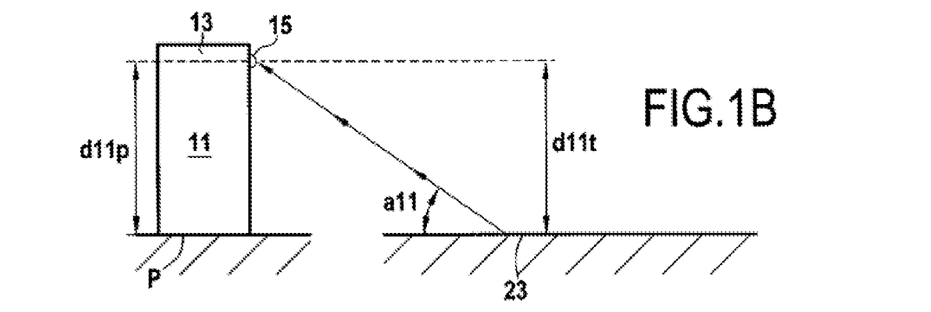
Figure 1C:
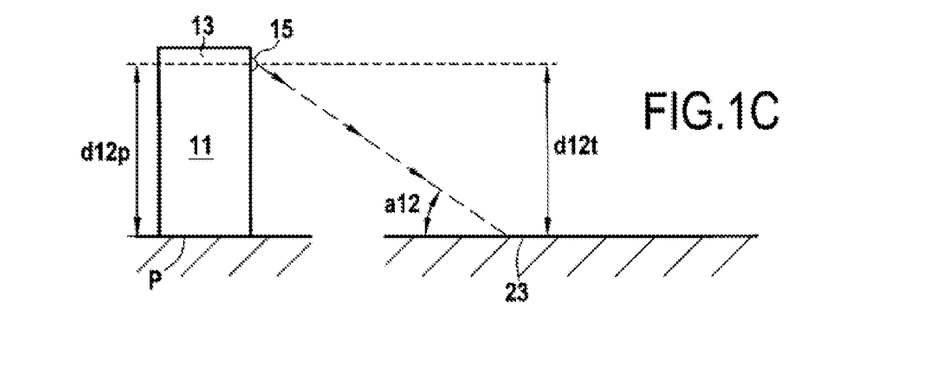

FIGS. 1A to 1C show an device 11 according to a first embodiment. In this first embodiment, the device comprises a support 13, a primary camera 15 and a primary projector 17, all unitary to the support 13. The support 13 comprises a base 19, defining a mounting plane P. The base 19 is placed on a mounting surface 21. When the base 19 is placed on the mounting surface 21, the mounting plane P and the mounting surface 21 merge.

In front of the device 11, there is a work area 23, in which a user wishes to carry out a registration 25. To choose the registration he wishes to carry out, the user can, for example, have a multimedia tablet or equivalent 27, hereinafter "tablet," on which several registration models are stored.

The support 13 comprises, here, a processing unit 29 and, for example, wired or wireless communication interfaces (not shown) of the "Bluetooth" type. These communication interfaces allow the processing unit 29 to communicate with the tablet 27, the primary camera 15 and the primary projector 17.

When the user chooses a registration model to be carried out in the work area 23 using the tablet 27, the tablet 27 transmits this model to the processing unit 29. The processing unit 29 then controls the primary camera 15 so that it captures a first image 24a of the working area 23. The primary camera 15 transmits the first image 24a to the processing unit 29. The processing unit 29 then processes this first image in order to readjust the registration model to be produced, thereby creating the second image 24b. The second image 24b is then transmitted to the primary projector 17, which projects it onto the work area 23. The user can then transcribe the registration they wish.

The first image 24a has a width hv between 100 mm (one hundred millimeters) and 400 mm (four hundred millimeters), in examples, the width hv is 250 mm (two hundred and fifty millimeters). The first image 24a has a length Lv of between 100 mm (one hundred millimeters) and 400 mm (four hundred millimeters), in examples, the length Lv is 300 mm (three hundred millimeters). For example, the first image 24a has an area comprised between 100 cm² (one hundred square centimeters) and 1,600 cm² (one thousand six hundred square centimeters).

The distance dv between the first image 24a and the support 13 is between 0 mm (zero millimeters) and 50 mm (fifty millimeters), in examples, the distance dv is 0 mm (zero millimeters).

According to a variant, the processing of the first image 24a so as to generate the second image 24b is carried out by the processing unit of the tablet 27. In this case, it is possible that the device does not include a processing unit.

The second image 24b has a width hp between 150 mm (one hundred and fifty millimeters) and 500 mm (five hundred millimeters), in examples, the width hp is 300 mm (three hundred millimeters). The second image 24b has a length Lp of between 150 mm (one hundred and fifty millimeters) and 600 mm (six hundred millimeters), in examples, the length Lv is 300 mm (three hundred millimeters). For example, the second image 24b has an area between 225 cm² (two hundred twenty-five square centimeters) and 3,000 cm² (three thousand square centimeters).

The distance dp between the second image 24b and the support 13 is between 0 mm (zero millimeters) and 200 mm (two hundred millimeters), in examples, the distance dp is 20 mm (twenty millimeters).

The primary camera 15 is directed towards the working area 23 and its optical axis is inclined relative to the mounting plane P by an angle a11 of approximately 50° (fifty degrees of angle). The primary projector 17 is directed towards the working area 23 and its optical axis is inclined relative to the mounting plane P by an angle a12 of approximately 69° (sixty-nine degrees of angle). The primary camera 15 is placed at a height d11p of approximately 320 mm (three hundred and twenty millimeters) relative to the mounting plane P. The primary camera 15 is placed at a height d11t of approximately 320 mm (three hundred and twenty millimeters) relative to the working area. The primary projector 17 is arranged at a height d12p of approximately 381 mm (three hundred and eighty-one millimeters) relative to the mounting plane P. The primary projector 17 is arranged at a height d12p of approximately 381 mm (three hundred and eighty-one millimeters) relative to the mounting plane P. Here, the working area 23 and the mounting plane P are included in the same plane. However, it is possible that the working area 23 and the mounting plane P are arranged in different planes and that the height of the primary projector 17 and the primary camera 15 is different if it is measured from the mounting plane P or from the work area 23.

According to a variant, shown in FIG. 1, the camera 15 and the projector 17 are arranged at the same height relative to the mounting plane P.

Figure 2A:
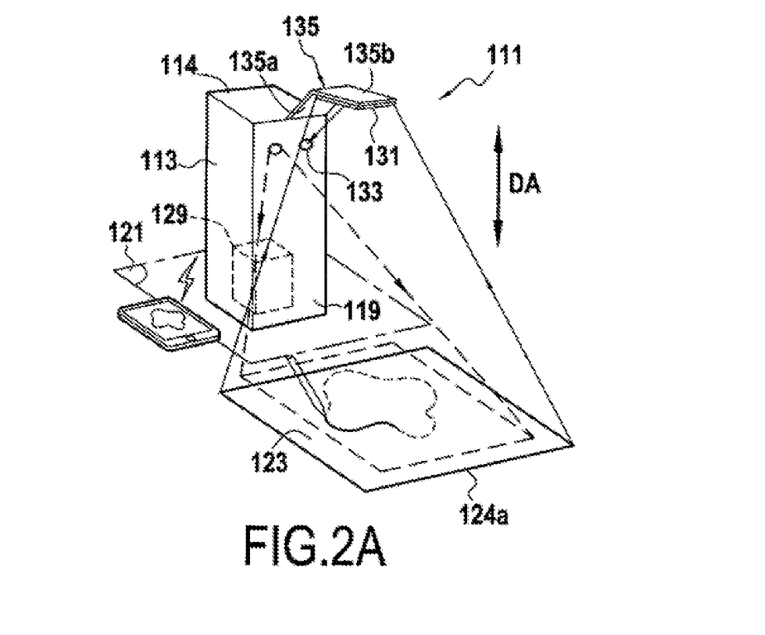
FIGS. 2A and 2B show an device according to a second embodiment.
Figure 2B:
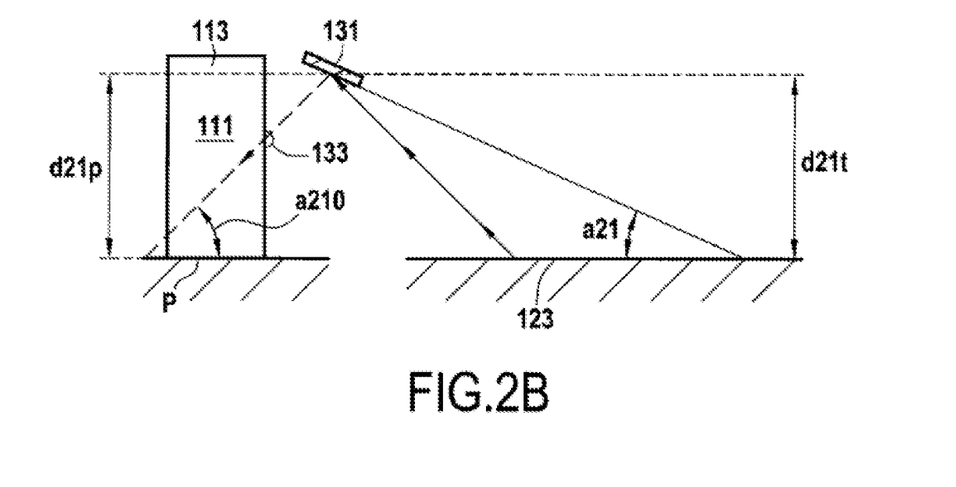

FIGS. 2A and 2B show a second embodiment of the device according to this disclosure. In the second embodiment, instead of a primary camera, the device 111 comprises a first mirror 131 and a secondary camera 133. The secondary camera 133 is mounted on the support 113 in the same place as the primary camera 15 in the first exemplary embodiment. However, the secondary camera 133 is oriented towards the first mirror 131. The optical axis of the secondary camera 133 is inclined relative to the mounting plane P by an angle a210 of about 10.5° (ten and a half degrees of angle). The first mirror 131 is mounted on the support 113, facing the secondary camera 133. The support 113 comprises a first mounting element 135 of the first mirror 131, via which the first mirror 131 is mounted on the support 113. Here, the first mounting member 135 has a general "V" shape. One of the ends of the first mounting element 135, that is to say, one end of a first bar 135a of the "V", is fixed to an upper edge 114 of the support 113. The upper edge 114 of the support 113 is defined in a direction DA of the height of the support 113 when the base 119 is placed on the mounting surface 121. In other words, the upper edge 114 of the support 113 is arranged opposite the base 119 in direction DA when it is placed on the mounting surface 121. The first mirror 131 is attached to the second bar 135b of the "V" of the first mounting element 135, inside the "V". When mounted on the first mounting element 135, the first mirror 131 is inclined relative to the mounting plane P by an angle a21 of approximately 20° (twenty degrees of angle). The first mirror 131 is arranged at a height d21p of approximately 320 mm (three hundred and twenty millimeters) relative to the mounting plane P. The primary projector 17 is arranged at a height d12t of approximately 320 mm (three hundred and twenty millimeters) relative to the working area 123.

Thus, the secondary camera 133 does not directly capture the first image 124a, but captures it via the first mirror 131. The processing unit 129 is therefore configured to communicate with the secondary camera 133.

According to a variant, the secondary camera 133 might not be mounted on the support 113 but instead be separate and arranged opposite the first mirror 131.

Figure 3A:
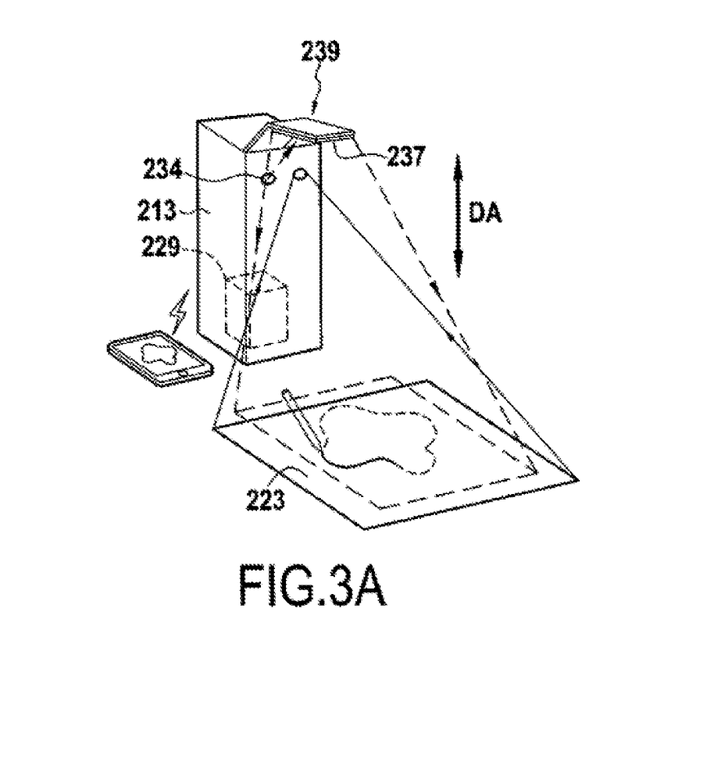
FIGS. 3A and 3B show an device according to a third embodiment.
Figure 3B:
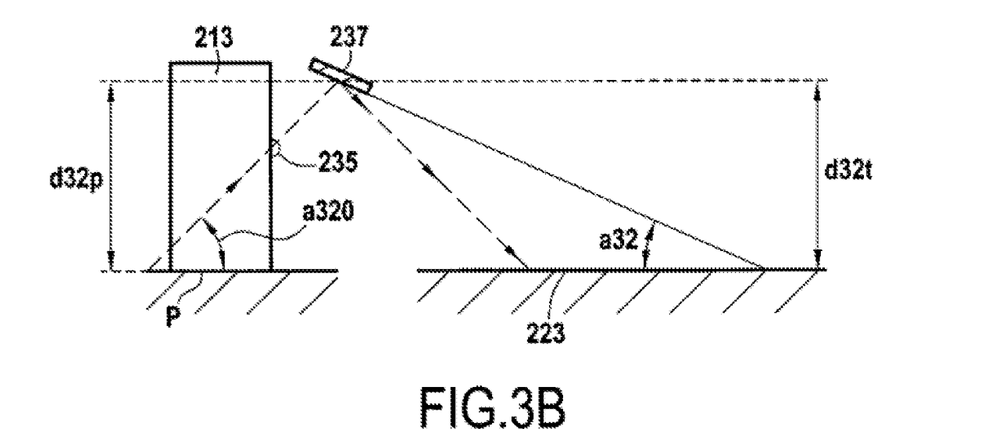

FIGS. 3A and 3B show a third embodiment of the device according to this disclosure. The third embodiment differs from the first embodiment in that, instead of the primary projector 17, the device comprises a secondary projector 234 and a second mirror 237. The secondary projector 234 is arranged in the same place as the primary projector 17 in the first embodiment. However, the secondary projector 234 is oriented towards the second mirror 237. The optical axis of the secondary projector 235 is inclined relative to the mounting plane P by an angle a320 of approximately 15.5° (fifteen and a half degrees of angle). The second mirror 237 is mounted on the support 213 facing the secondary projector 234. The support 213 comprises a second mounting element 239 of the second mirror 237, via which the second mirror 237 is mounted on the support 213. The second mounting element 239 has the same configuration as the first mounting element 135 of the second embodiment, but is arranged at the level of the secondary projector 234. Thus, when it is mounted on the second mounting element 239, the second mirror 237 is inclined relative to the mounting plane P by an angle a32 of approximately 27° (twenty-seven degrees of angle).

The second mirror 237 is arranged at a height d32p of approximately 381 mm (three hundred and eighty-one millimeters) relative to the mounting plane P. The second mirror 237 is arranged at a height d32t of approximately 381 mm (three hundred and eighty-one millimeters) relative to the working area 223.

In this embodiment, the processing unit 229 is therefore configured to communicate with the secondary projector 234.

Figure 4:
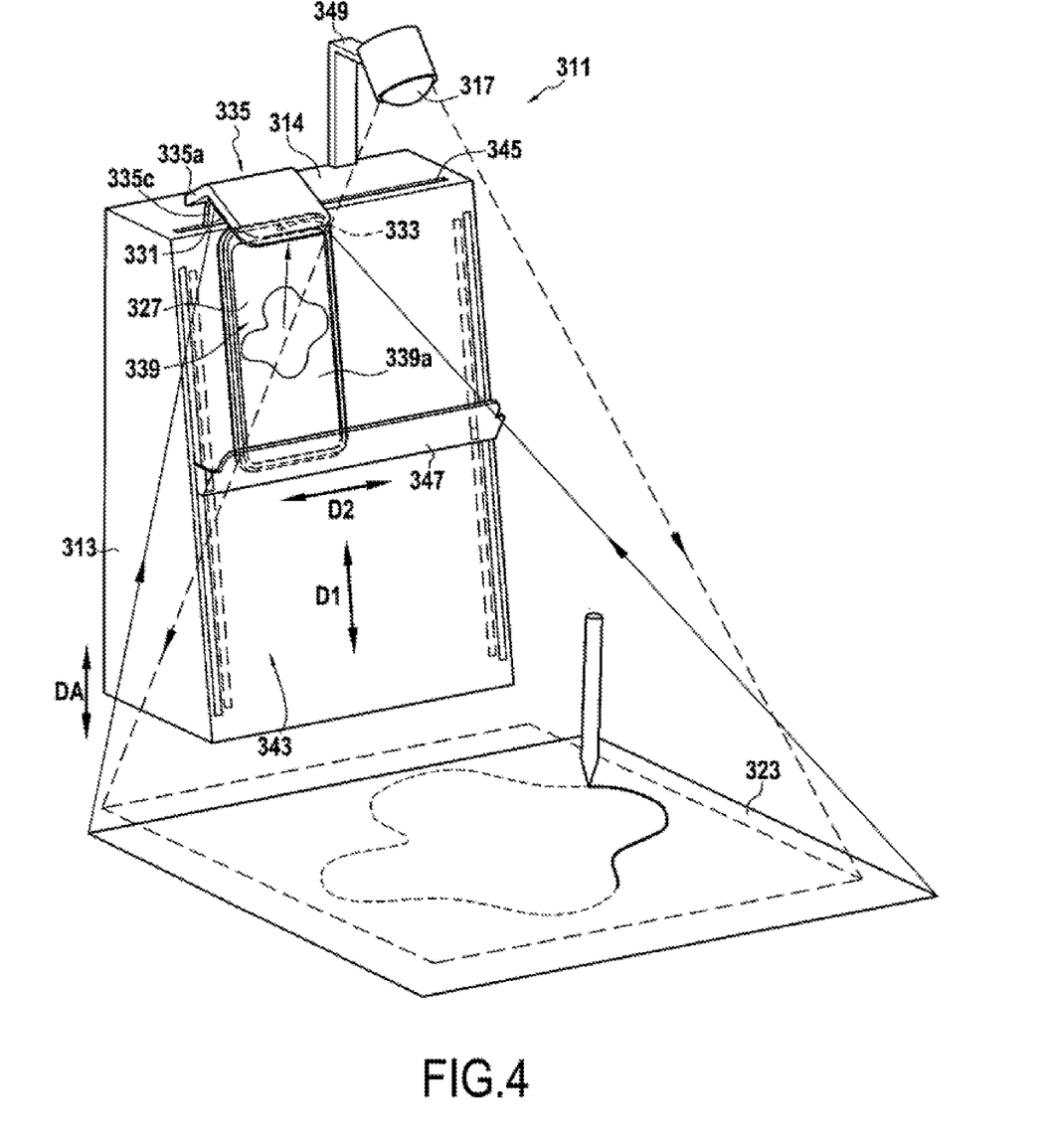
FIG. 4 shows an device according to a fourth embodiment.

FIG. 4 represents a fourth exemplary embodiment, in which the secondary camera described in the second exemplary embodiment is constituted by the camera 333 of the tablet 327. The tablet 327 is therefore placed on the support 313 so that the camera 333 of the tablet 327 is arranged opposite the first mirror 331.

The tablet 327 includes a front face 339, having a screen 339a, and a rear face opposite the front face 339. The camera 333 of the tablet 327 is adjacent to the screen 339a on the front face 339.

In this exemplary embodiment, the support 313 comprises a support portion 343 which is configured to receive the tablet 327. The support portion 343 is more particularly configured to cooperate with the rear face of the shelf 327, so that the screen 339a is visible.

The support portion 343 extends in a first direction D1 and in a second direction D2 transverse to the first direction D1. The inclination of the support portion 11 relative to a normal to the mounting plane P is less than 20° (twenty degrees of angle). The projection of the support portion on the normal to the mounting plane P has a length of 330 mm (three hundred and thirty millimeters).

The first mirror 331 is movable in the second direction D2. Thus, the device 311 is versatile and can adapt to different sizes and/or configurations of tablet 327. The first mirror 331 is mounted on the support 313 as described for the second embodiment, but in a movable manner. Thus, the first mounting element 335 comprises a third bar 335c, fixed to the first bar 335a of the "V". The support 313 comprises a slide 345 into which the third bar 335c of the first mounting element 335 can be inserted and slide so as to allow the first mirror 331 to slide in the second direction D2. Thus, it is possible to adjust the position of the first mirror 331 so that it is located in front of the camera 333 of the tablet 327. The angle between the first mirror 331 and the support portion 343 is equal to 59.5° (fifty-nine and a half degrees of angle).

According to a variant, the first mirror 331 can also be movable relative to the support 313 in the first direction D1 or in the direction DA. Thus, the device 311 would be more versatile and could better adapt to different sizes and/or configurations of tablet 327.

The support 313 further comprises a support portion 347, configured to support the shelf 327, on which the shelf 327 is configured to rest. The support portion 347 is movable in the first direction D1. Thus, the device 311 would be more versatile and could better adapt to different sizes and/or configurations of shelf 327. In the embodiment shown, the support portion 347 is movable only in the first direction D1. The support portion 347 extends continuously over a portion of the width of the support portion 343.

As in the first and second embodiment, the device 311 here comprises a primary projector 317. The support 313 comprises a third mounting element 349 making it possible to mount the primary projector 317 on the support 313. The third mounting element 349 is fixed to the upper edge 314 of the support 313.

Figure 5:
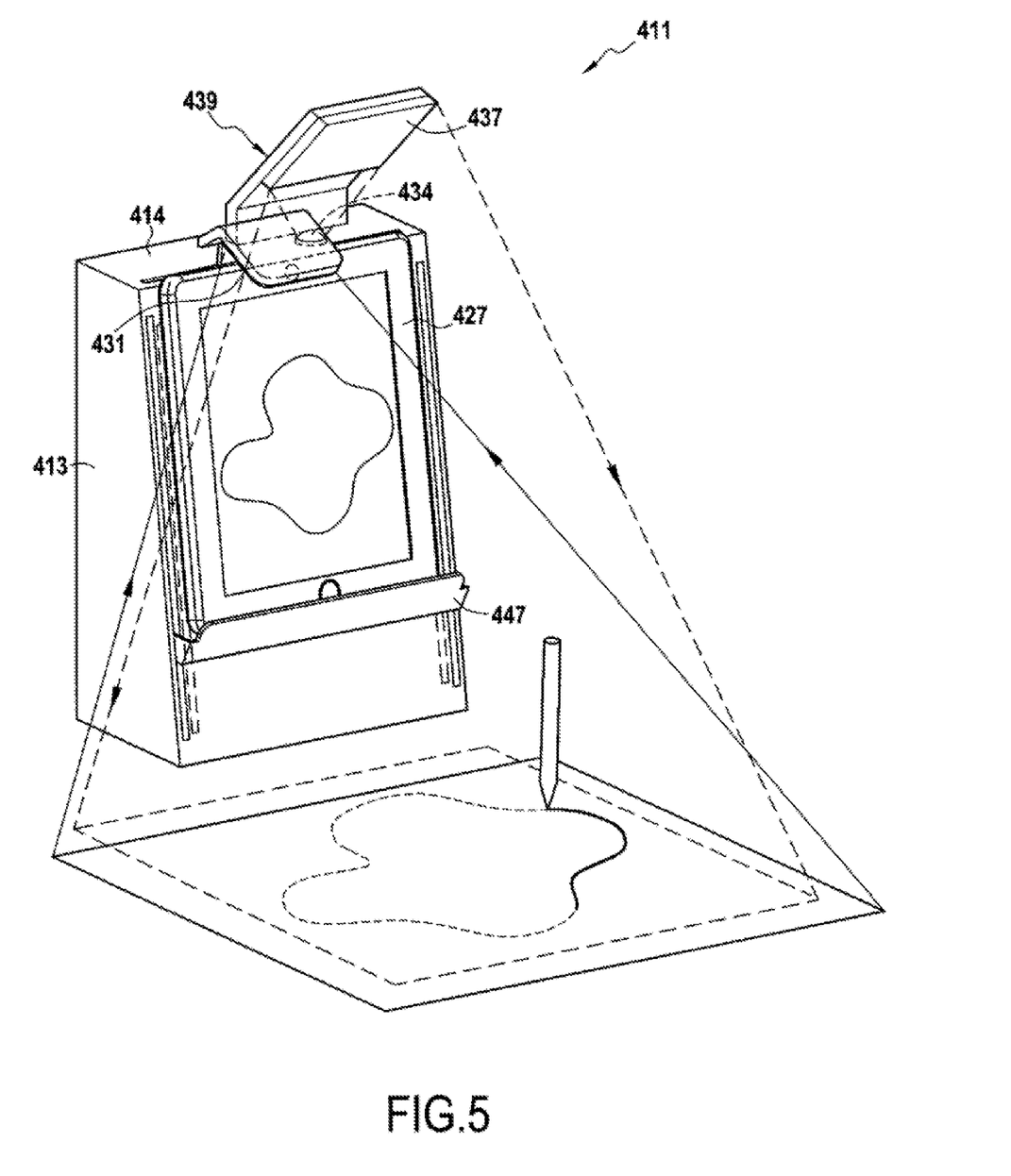
FIG. 5 shows an device according to a fifth embodiment.

FIG. 5 represents a fifth exemplary embodiment. The fifth exemplary embodiment corresponds to the fourth embodiment, comprising, in place of the primary projector 317, a secondary projector 434 and a second mirror 437, as is the case in the third exemplary embodiment. The secondary projector 434 is embedded in the upper edge 414 of the support 413. The second mirror 437 is mounted on the upper edge 414 of the support 413, thanks to a second mounting element 439, similar to the second mounting element 239 of the third embodiment.

In FIG. 5, it can be seen that the tablet 427 has dimensions that are greater than the dimensions of the tablet 327 shown in FIG. 4. Thus, thanks to the portion of support portion 347, 447, and to the first movable mirror 331, 431, the device 311, 411 can adapt to different sizes and/or configurations of tablet 327, 427, and is therefore versatile.

According to other embodiments, the device 11 could comprise a user interface, for example, a screen mounted on the support 13 and with which the user could choose the registration which he wishes to carry out, instead of the tablet. In this case, the device could include a communication interface allowing the device to connect to an Internet type network so that the user can download registration templates from this network, and make software updates, but not necessarily. The device can also be completely autonomous (i.e. integrated user interface and processing unit).

Although this invention has been described with reference to specific embodiments, it is obvious that modifications and changes can be made to these examples without departing from the general scope of the invention as defined by the claims. In particular, individual features of the various illustrated/mentioned embodiments can be combined in additional embodiments. Therefore, the description and the drawings should be considered in an illustrative rather than restrictive sense.

The invention claimed is:

1. A device configured to support a multimedia device the device comprising:
    a support configured to support the multimedia device that is configured to capture a first image,
    a first mirror configured to reflect, towards a camera, a first image of a work area, the first mirror being mounted on the support, and
    a projector mounted on the support, wherein the projector is configured to project a second image on the work area, or a second mirror mounted on the support, wherein the second mirror is configured to reflect the second image on the work area,
    wherein the support is configured to receive the multimedia device, equipped with the camera, the first mirror being movable, so as to be arranged in front of the camera of the multimedia device.

2. The device according to claim 1, wherein the support has a mounting plane intended to come to bear on a mounting surface, wherein the support is configured to receive the multimedia device so that an optical axis of the camera is inclined relative to the mounting plane and an angle between the optical axis of the camera and the mounting plane is between 45° and 90°, or wherein the first mirror is inclined relative to the mounting plane and an angle between the first mirror and the mounting plane is between 0 and 45°.

3. The device according to claim 1, wherein the support has a mounting plane intended to come to bear on a mounting surface, wherein an optical axis of the projector is inclined relative to the mounting plane and an angle between the optical axis of the projector and the mounting plane is between 50° and 90°, or wherein the second mirror is inclined relative to the mounting plane and an angle between the second mirror and the mounting plane is between 0 and 40°.

4. The device according to claim 1, comprising a processing unit mounted on the support, the processing unit being configured to generate the second image from the first image.

5. The device according to claim 1, wherein the projector or the second mirror is unitary to the support.

6. The device according to claim 1, wherein the device comprises the second mirror and a secondary projector, and the secondary projector is configured to project the second image to the second mirror.

7. The device according to claim 1, wherein the first mirror is configured to reflect towards the camera the first image having an area between 100 cm$^2$ and 1,600 cm$^2$.

8. The device according to claim 1, wherein the first mirror is configured to reflect towards the camera the first image that is arranged at a distance less than or equal to 5 cm from the support.

9. The device according to claim 1, wherein the projected second image has an area between 225 cm$^2$ and 3,000 cm$^2$.

10. The device according to claim 1, wherein the projected second image is at a distance less than or equal to 20 cm from the support.

* * * * *